(12) United States Patent
Shoolbraid et al.

(10) Patent No.: US 10,682,834 B2
(45) Date of Patent: Jun. 16, 2020

(54) ANTIFOG POLYESTER LIDDING FILM FOR CPET TRAYS

(71) Applicant: TORAY PLASTICS (AMERICA), INC., N. Kingstown, RI (US)

(72) Inventors: Kari Shoolbraid, Pawtucket, RI (US); Takafumi Sakai, Mishima (JP)

(73) Assignee: TORAY PLASTICS (AMERICA), INC., N. Kingstown, RI (US)

( * ) Notice: Subject to any disclaimer, the term of this patent is extended or adjusted under 35 U.S.C. 154(b) by 173 days.

(21) Appl. No.: 15/476,413

(22) Filed: Mar. 31, 2017

(65) Prior Publication Data

US 2018/0281363 A1 Oct. 4, 2018

(51) Int. Cl.
*B32B 27/18* (2006.01)
*B32B 27/36* (2006.01)
(Continued)

(52) U.S. Cl.
CPC .......... *B32B 27/18* (2013.01); *B29C 48/0018* (2019.02); *B29C 48/022* (2019.02); *B29C 48/21* (2019.02); *B29C 48/22* (2019.02); *B29C 55/005* (2013.01); *B32B 27/08* (2013.01); *B32B 27/306* (2013.01); *B32B 27/32* (2013.01); *B32B 27/36* (2013.01); *B05D 1/265* (2013.01); *B05D 1/305* (2013.01); *B05D 3/142* (2013.01); *B29C 48/08* (2019.02); *B29C 48/185* (2019.02); *B29C 55/12* (2013.01); *B29K 2023/0633* (2013.01); *B29K 2023/083* (2013.01); *B29K 2067/00* (2013.01); *B29L 2031/565* (2013.01); *B32B 7/02* (2013.01); *B32B 7/04* (2013.01); *B32B 7/12* (2013.01); *B32B 27/30* (2013.01); *B32B 37/12* (2013.01); *B32B 37/15* (2013.01); *B32B 37/153* (2013.01); *B32B 2037/1246* (2013.01); *B32B 2250/04* (2013.01); *B32B 2250/05* (2013.01); *B32B 2250/24* (2013.01); *B32B 2255/10* (2013.01); *B32B 2255/26* (2013.01); *B32B 2307/30* (2013.01); *B32B 2307/31* (2013.01);
(Continued)

(58) Field of Classification Search
None
See application file for complete search history.

(56) References Cited

U.S. PATENT DOCUMENTS 3,541,040 A * 11/1970 Laird ..................... C08K 5/00
523/169
4,076,895 A * 2/1978 Theno ................... B29C 43/222
428/516

(Continued)

FOREIGN PATENT DOCUMENTS

JP 01-108236 A * 4/1989
JP 2003-236910 A * 8/2003
(Continued)

*Primary Examiner* — Vivian Chen
(74) *Attorney, Agent, or Firm* — Morrison & Foerster LLP (57) ABSTRACT

The present disclosure is directed to peelable, heat-sealable lidding films for containers of diverse polymer compositions storing various products such as foodstuffs and pharmaceuticals. The lidding films disclosed herein can be heat-sealed to crystalline polyester trays (CPET), easily peeled, and contain improved antifogging performance by incorporating a non-migratory antifogging additive into the heat sealable layer of the film without deteriorating seal strengths.

15 Claims, 2 Drawing Sheets

(51) Int. Cl.

| | | |
|---|---|---|
| B32B 27/30 | (2006.01) | |
| B32B 27/08 | (2006.01) | |
| B32B 27/32 | (2006.01) | |
| B29C 55/00 | (2006.01) | |
| B29C 48/00 | (2019.01) | |
| B29C 48/21 | (2019.01) | |
| B29C 48/22 | (2019.01) | |
| B29C 55/12 | (2006.01) | |
| B29K 67/00 | (2006.01) | |
| B29K 23/00 | (2006.01) | |
| B29L 31/56 | (2006.01) | |
| B29C 48/18 | (2019.01) | |
| B29C 48/08 | (2019.01) | |
| B05D 3/14 | (2006.01) | |
| B05D 1/30 | (2006.01) | |
| B05D 1/26 | (2006.01) | |
| B32B 7/02 | (2019.01) | |
| B32B 37/15 | (2006.01) | |
| B32B 37/12 | (2006.01) | |
| B32B 7/04 | (2019.01) | |
| B32B 7/12 | (2006.01) | |
| B65D 43/02 | (2006.01) | |
| C08J 7/052 | (2020.01) | |
| B65D 43/00 | (2006.01) | |
| C08J 5/18 | (2006.01) | |
| C09J 131/04 | (2006.01) | |
| C08K 5/00 | (2006.01) | |
| C09J 123/06 | (2006.01) | |
| C09J 179/00 | (2006.01) | |
| C08K 5/42 | (2006.01) | |
| C08L 23/06 | (2006.01) | |
| C08L 31/04 | (2006.01) | |

(52) U.S. Cl.
CPC ... *B32B 2307/702* (2013.01); *B32B 2307/704* (2013.01); *B32B 2307/746* (2013.01); *B32B 2323/046* (2013.01); *B32B 2331/04* (2013.01); *B32B 2367/00* (2013.01); *B32B 2379/00* (2013.01); *B32B 2439/00* (2013.01); *B65D 43/00* (2013.01); *B65D 43/02* (2013.01); *C08J 5/18* (2013.01); *C08J 7/052* (2020.01); *C08K 5/0008* (2013.01); *C08K 5/42* (2013.01); *C08L 23/06* (2013.01); *C08L 31/04* (2013.01); *C08L 2203/162* (2013.01); *C08L 2205/03* (2013.01); *C08L 2310/00* (2013.01); *C09J 123/06* (2013.01); *C09J 131/04* (2013.01); *C09J 179/00* (2013.01); *Y10T 428/24942* (2015.01); *Y10T 428/28* (2015.01); *Y10T 428/287* (2015.01); *Y10T 428/2817* (2015.01); *Y10T 428/2826* (2015.01); *Y10T 428/2843* (2015.01); *Y10T 428/2878* (2015.01); *Y10T 428/31786* (2015.04); *Y10T 428/31797* (2015.04); *Y10T 428/31855* (2015.04); *Y10T 428/31913* (2015.04); *Y10T 428/31928* (2015.04); *Y10T 428/31935* (2015.04); *Y10T 428/31938* (2015.04)

(56) References Cited

U.S. PATENT DOCUMENTS

| | | | | | |
|---|---|---|---|---|---|
| 4,341,825 | A * | 7/1982 | Kemski | | B32B 27/08 206/484 |
| 4,551,484 | A * | 11/1985 | Radisch | | B32B 17/1033 427/389.7 |
| 4,835,194 | A * | 5/1989 | Bright | | C08K 5/06 523/169 |
| 4,876,146 | A * | 10/1989 | Isaka | | B32B 7/02 428/347 |
| 5,126,176 | A * | 6/1992 | Blaskovitz | | B32B 27/06 428/349 |
| 5,156,904 | A * | 10/1992 | Rice | | B32B 27/08 428/219 |
| 5,180,760 | A * | 1/1993 | Oshibe | | C03C 17/32 523/169 |
| 5,451,460 | A * | 9/1995 | Lu | | C08J 3/03 428/349 |
| 5,520,764 | A * | 5/1996 | Toney | | B29C 47/0021 156/244.17 |
| 5,534,577 | A * | 7/1996 | Namba | | C08L 23/26 524/247 |
| 5,567,533 | A * | 10/1996 | Toney | | B29C 47/0021 156/244.11 |
| 5,667,858 | A * | 9/1997 | Pokorny | | C09J 121/00 428/41.8 |
| 6,004,660 | A * | 12/1999 | Topolski | | C08J 7/0423 428/212 |
| 6,063,462 | A * | 5/2000 | Tsukamoto | | B32B 27/32 428/36.7 |
| 6,184,298 | B1 * | 2/2001 | Lee | | B32B 7/12 525/240 |
| 6,682,825 | B1 * | 1/2004 | Kennedy | | B32B 27/08 428/517 |
| 6,706,389 | B1 * | 3/2004 | Bates | | B32B 27/18 428/349 |
| 6,800,688 | B2 * | 10/2004 | Usui | | C08F 255/00 525/69 |
| 6,958,193 | B2 | 10/2005 | Itaya et al. | | |
| 7,794,794 | B2 * | 9/2010 | Patchen | | C09K 3/18 427/384 |
| 8,273,447 | B2 * | 9/2012 | Forloni | | B32B 27/32 428/212 |
| 2004/0241452 | A1 * | 12/2004 | Itaya | | B32B 27/18 428/423.1 |
| 2005/0136275 | A1 * | 6/2005 | Kamei | | B32B 27/18 428/520 |
| 2005/0208282 | A1 * | 9/2005 | Wood, Jr. | | B32B 27/36 428/216 |
| 2006/0105126 | A1 * | 5/2006 | Kendig | | B32B 27/08 428/35.2 |
| 2008/0249211 | A1 * | 10/2008 | Smink | | C08J 3/226 523/351 |
| 2009/0011263 | A1 * | 1/2009 | Forloni | | B32B 27/32 428/483 |
| 2009/0197022 | A1 * | 8/2009 | Lu | | B05D 7/04 428/29 |
| 2010/0159795 | A1 * | 6/2010 | Sarnstrom | | A63H 27/10 446/220 |
| 2011/0060061 | A1 * | 3/2011 | Smink | | C08J 3/203 521/50 |
| 2011/0163101 | A1 * | 7/2011 | Deng | | B32B 27/36 220/361 |
| 2012/0245250 | A1 * | 9/2012 | Kano | | C08F 220/14 523/169 |
| 2013/0029553 | A1 * | 1/2013 | Trouilhet | | B32B 7/12 442/327 |
| 2014/0127515 | A1 * | 5/2014 | Sakellarides | | B32B 27/08 428/413 |
| 2014/0234493 | A1 * | 8/2014 | Forloni | | B32B 27/08 426/113 |
| 2014/0319139 | A1 * | 10/2014 | Johansen | | B32B 27/08 220/269 |
| 2014/0329015 | A1 * | 11/2014 | Montcrieff | | B32B 27/08 427/322 |
| 2015/0283029 | A1 * | 10/2015 | Riis | | B65D 65/40 206/438 |

FOREIGN PATENT DOCUMENTS

| | | | |
|---|---|---|---|
| JP | 2006-281725 A | * | 10/2006 |
| JP | 2006-297761 A | * | 11/2006 |

\* cited by examiner

ANTIFOG POLYESTER LIDDING FILM FOR CPET TRAYS

FIELD OF THE DISCLOSURE

This disclosure relates to antifog polyester lidding films. More particularly, this disclosure relates to heat-sealable antifog polyester lidding films for crystalline polyester trays (CPET).

BACKGROUND

Sealed containers with food products such as pastas, salads, wraps, sandwiches, and fruit can provide a quick and convenient meal to consumers who crave something freshly made. As more and more ready-to-eat meals are available at grocery stores, consumers are overwhelmed with choices and frequently rely on product appearance in choosing their food. Many of these meals are packaged in plastic trays with sealed lids made out of highly transparent, flexible films. However, if the food product contains high amounts of water, the water can bead up on the lidding film in hot or cold environments. This can create a foggy appearance that reduces the visibility of the product to the consumer which, in turn, may decrease the consumer's probability of buying it.

In addition, many lidding films focus on being used as lidding for amorphous polyester trays (APET). However, this type of tray is not ovenable and therefore limited to cold or refrigerated only applications.

SUMMARY

Disclosed herein are peelable, heat-sealable lidding films for containers of diverse polymer compositions storing various products such as foodstuffs and pharmaceuticals. Many trays or food containers are prepared and filled in-house (e.g., at the grocery store). These trays can have a lip extending on the top of the tray for a flexible film to be sealed using a manual sealer with little to no contamination from the food on the lip. This film can be embedded with antifogging properties that allow the water condensation droplets to wet-out on the surface in order to maintain clarity for the consumer. One approach to embed the antifogging properties into the lidding film is to solution-coat an anti-fogging agent onto the sealable film. Most coatings used to create antifogging performance are solvent-based which can evaporate into volatile organic compounds (VOCs) which are the increasing focus of air emissions and air quality legislation. Another approach is to impart a migratory additive into the outer layer of the film that will migrate and "bloom" to the surface. The additive is polar and helps the condensation wet-out into a clear layer that does not hinder the product's appearance. However, many times the polar molecules that bloom to the surface can impact seal strength and decrease it to an unwanted level.

Applicants have discovered a dual ovenable lidding film that can be heat-sealed to crystalline polyester trays (CPET), easily peeled, and contains improved antifogging performance by incorporating a non-migratory antifogging additive into the heat sealable layer of the film without deteriorating seal strengths. Specifically, the lidding films disclosed herein can provide clarity for a product that is kept cold before purchase and can be used when heating the product either in a microwave or oven.

In some embodiments, a lidding film includes a biaxially oriented polyester-based base film and an extrusion-coated heat seal structure on a side of the base film, wherein the heat seal structure includes a skin layer including 0.2-5.5 wt % non-migratory antifog active ingredient and 70-99 wt % ethylene vinyl acetate (EVA). In some embodiments, the non-migratory antifog active ingredient includes a non-ionic surfactant and a salt of organic sulfonic acid. In some embodiments, the weight ratio of the non-ionic surfactant to the salt of organic sulfonic acid is 20/80-99/1. In some embodiments, the skin layer includes a polyethylene carrier resin for the non-migratory antifog active ingredient. In some embodiments, the non-migratory antifog active ingredient includes 10-25 wt % of the combination of non-migratory antifog active ingredient and polyethylene carrier resin in the skin layer. In some embodiments, the polyester-based base film includes a crystalline polyester base layer and an amorphous polyester skin layer. In some embodiments, the extrusion-coated heat seal structure is on a side of the amorphous polyester skin layer opposite the crystalline polyester base layer. In some embodiments, the crystalline polyester base layer includes a polyester resin with an intrinsic viscosity of 0.5-0.9 dl/g. In some embodiments, the crystalline polyester base layer includes polyethylene terephthalate. In some embodiments, the amorphous polyester skin layer includes at least one of isophthalate modified copolyesters, sebacic acid modified copolyesters, diethyleneglycol modified copolyesters, triethyleneglycol modified copolyesters, or cyclohexanedimethanol modified copolyesters. In some embodiments, a primer layer is between the amorphous polyester skin layer and the heat seal structure. In some embodiments, a primer layer is between the polyester-based base film and the extrusion-coated heat seal structure. In some embodiments, the polyester-based base film includes 0.1-0.4 wt % antiblock or slip additives. In some embodiments, the heat seal structure includes a core layer including EVA on a side of the skin layer. In some embodiments, the heat seal structure includes a tie layer including low density polyethylene (LDPE) on a side of the core layer opposite the skin layer. In some embodiments, a primer layer is between the tie layer and the base film. In some embodiments, the lidding film has an antifog ranking of at least 6. In some embodiments, the lidding film has a seal strength to crystalline polyester trays of 500-2500 gf/in. In some embodiments, a lidding film includes a biaxially oriented polyester-base film including a crystalline polyester base layer and an amorphous polyester skin layer and an extrusion-coated heat seal structure on a side of the base film, wherein the heat seal structure includes: a tie layer including low density polyethylene (LDPE) on a side of the amorphous polyester skin layer opposite the crystalline polyester base layer; a core layer including EVA on a side of the tie layer opposite the amorphous polyester skin layer; and a skin layer including 0.2-5.5 wt % non-migratory antifog active ingredient and 70-99 wt % ethylene vinyl acetate on a side of the core layer opposite the tie layer. In some embodiments, a primer layer is between the amorphous polyester skin layer and the tie layer.

In some embodiments, a method of forming a lidding film includes biaxially orienting a polyester-based base film and extrusion coating a heat seal structure including a skin layer including 0.2-5.5 wt % non-migratory antifog active ingredient and 70-99 wt % ethylene vinyl acetate (EVA) on a side of the polyester-based base film. In some embodiments, the non-migratory antifog active ingredient includes a non-ionic surfactant and a salt of organic sulfonic acid. In some embodiments, the weight ratio of the non-ionic surfactant to the salt of organic sulfonic acid is 20/80-99/1. In some embodiments, the skin layer includes a polyethylene carrier resin for the non-migratory antifog active ingredient. In some embodiments, the non-migratory antifog active ingredient includes 10-25 wt % of the combination of non-migratory antifog active ingredient and polyethylene carrier resin in the skin layer. In some embodiments, the method includes co-extruding a crystalline polyester base layer and an amorphous polyester skin layer to form the polyester-based base film. In some embodiments, the heat seal structure is extrusion coated on a side of the amorphous polyester skin layer opposite the crystalline polyester base layer. In some embodiments, the method includes solution coating a primer layer on a side of the polyester-based base film, wherein the extrusion-coated skin layer is on a side of the primer layer opposite the polyester-based base film. In some embodiments, the solution coating includes gravure roll coating. In some embodiments, the method includes corona treating the skin layer. In some embodiments, the lidding film has an antifog ranking of at least 6. In some embodiments, the lidding film has a seal strength to crystalline polyester trays of 500-2500 gf/in. In some embodiments, a method of forming a lidding film includes co-extruding a crystalline polyester base layer and an amorphous polyester skin layer to form a polyester-based base film; biaxially orienting the polyester-based base film; solution coating a primer layer including polyethylenimine on a side of the amorphous polyester skin layer opposite the crystalline polyester base layer; extrusion coating a tie layer including LDPE on a side of the primer layer opposite the amorphous polyester skin layer; extrusion coating a core layer including EVA on a side of the tie layer opposite the primer layer; and extrusion coating a skin layer including 0.2-5.5 wt % non-migratory antifog active ingredient and 70-99 wt % ethylene vinyl acetate (EVA) on a side of core layer opposite the tie layer.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters. For example, a statement that the layer has less than about 20 wt %, about 15 wt %, or about 10 wt % EVA, is meant to mean that the weight percentage of EVA in the layer can be less than about 20 wt %, less than about 15 wt %, or less than about 10 wt %.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Additional advantages will be readily apparent to those skilled in the art from the following detailed description. The examples and descriptions herein are to be regarded as illustrative in nature and not restrictive.

BRIEF DESCRIPTION OF THE DRAWINGS

Exemplary embodiments are described with reference to the accompanying figures, in which.

DETAILED DESCRIPTION

Disclosed herein are antifogging lidding films for crystalline polyester ("CPET") containers used in packaging goods containing moisture, such as fruits, vegetables, and prepared foods. The antifogging lidding films disclosed herein can be heat-sealed to crystalline polyester trays (CPET), easily peeled, and contain improved antifogging performance by incorporating a non-migratory antifogging additive into the heat sealable layer of the film without deteriorating seal strengths. The lidding films disclosed herein can provide clarity for a product that is kept cold before purchase and can be used when heating the product either in a microwave or oven. Specifically, the antifogging lidding films can include a biaxially oriented polyester film extrusion-coated with a heat-sealable layer that has anti-fog properties obtained by incorporating a non-migratory antifogging additive.

Figure 1:
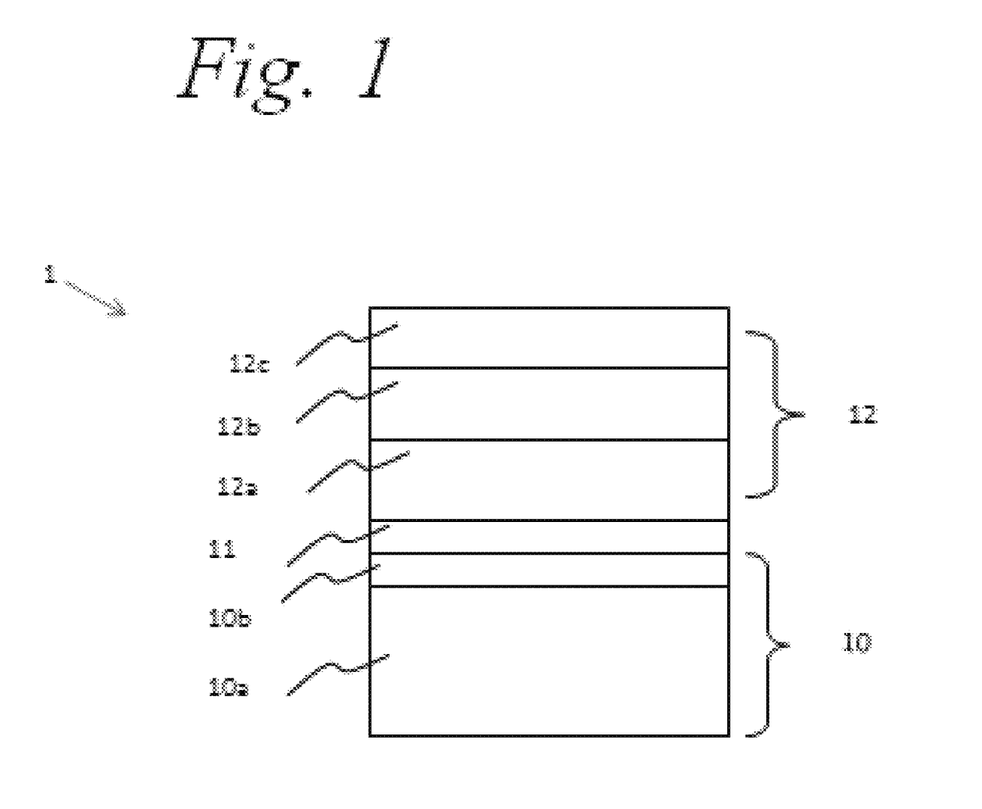
FIG. 1 illustrates an example of an embodiment of a sealable lidding film disclosed herein.
Figure 2A:
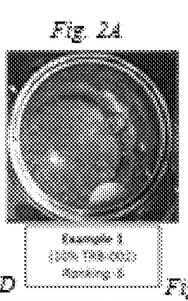
FIG. 2A is the picture of Example 1's antifogging performance at 120 minutes.
Figure 2B:
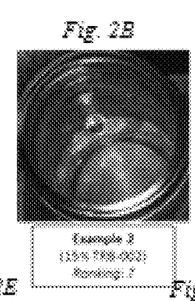
FIG. 2B is the picture of Example 2's antifogging performance at 120 minutes.
Figure 2C:
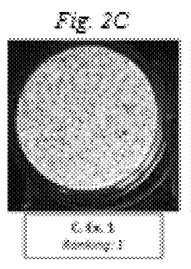
FIG. 2C is the picture of Comparative Example 1's antifogging performance at 120 minutes.
Figure 2D:
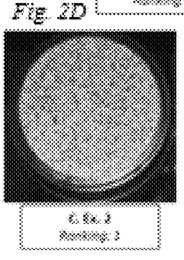
FIG. 2D is the picture of Comparative Example 2's antifogging performance at 120 minutes.
Figure 2E:
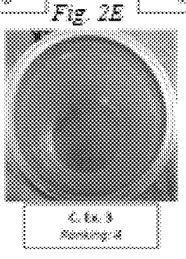
FIG. 2E is the picture of Comparative Example 3's antifogging performance at 120 minutes.
Figure 2F:
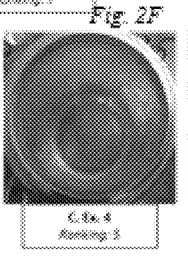
FIG. 2F is the picture of Comparative Example 4's antifogging performance at 120 minutes.
Figure 2G:
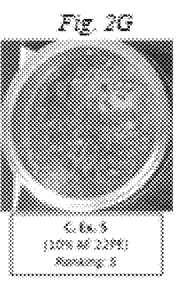
FIG. 2G is the picture of Comparative Example 5's antifogging performance at 120 minutes.

FIG. 1 provides an example of an embodiment of a sealable lidding film disclosed herein. The sealable lidding film can include a base film. As shown in FIG. 1, sealable lidding film 1 includes base film 10. The base film can be a mono-layer or multi-layer film. In some embodiments, the base film can include two layers as shown in FIG. 1. The base film can provide structural integrity of the sealable lidding film and can support other layers of the sealable lidding film.

The base film can be a mono-axially or a biaxially-oriented film. Biaxial orientation may be sequential or simultaneous by known methods. In addition, the base film can be a polyester-based film. For example, the base film can include polyethylene terephthalate (PET). In some embodiments, the base film is a biaxially-oriented polyethylene terephthalate (BOPET) film. In some embodiments, the thickness of the base film is 9-23 microns.

Typical polyester resins used in the base film can include, but are not limited to: homopolyesters or copolyesters of polyethylene terephthalate (PET), polyethylene naphthalate (PEN), polyethylene terephthalate-co-isophthalate copolymer, polyethylene terephthalate-co-naphthalate copolymer, polycyclohexylene terephthalate, polyethylene-co-cyclohexylene terephthalate, polyether-ester block copolymer, ethylene glycol or terephthalic acid-based polyester homopolymers and copolymers, and combinations thereof. In some embodiments, the polyester comprises poly(ethylene terephthalate) repeat units. The polyester in the base film can comprise about 70-99.9 wt %. In some embodiments, the base film can be a commercially available polyester film such as Toray Plastics (America), Inc.'s Lumirror™ PA10.

In some embodiments, the base film is a two-layer film including a first layer on a side of a second layer. In some embodiments, the two-layer base film can be a first layer coextruded with a second layer. In some embodiments, the base film can include a base layer and/or a skin layer. For example, FIG. 1 includes base layer 10a and skin layer 10b of base film 10. The base layer and the skin layer of the base film can include any of the polyesters described above. In some embodiments, the skin layer of the base film can be an amorphous polyester skin layer. The amorphous polyester skin layer can help promote adequate adhesion of the heat seal structure to the base film. In some embodiments, the base layer of the base film can be a crystalline polyester layer.

The term "crystalline polyester" can refer to a polyester that has developed at least partial crystallinity during the orientation and heat-setting steps of the film-making process. Crystallinity can involve a regular repeating arrangement of the molecules. To produce a crystal, the polymer chains can be capable of packing closely together in a regular, parallel array. The formation of crystals can require polymer chain mobility. Once a certain degree of crystallinity is attained (which depends on the temperature at which crystallization is taking place) further mobility can be restricted so a fraction of the polymer remains in a non-crystalline state ("amorphous"). Thus the term "degree of crystallinity" can reflect the relative amount of crystalline regions and amorphous regions.

The crystalline polyester layer can be a high crystalline polyester layer. The high crystalline polyester layer can include high intrinsic viscosity (IV) homopolyesters such as PET, PBT, or PEN, or copolymers or blends thereof. In some embodiments, the crystalline polyester layer can include a polyester resin with an intrinsic viscosity greater than about 0.4 dl/g, about 0.45 dl/g, about 0.5 dl/g, about 0.55 dl/g, about 0.6 dl/g, or about 0.65 dl/g.

In some embodiments, the crystalline polyester layer includes polyethylene terephthalate. In some embodiments, the crystalline polyester layer can include a polyester resin with an intrinsic viscosity ranging between about 0.45-0.95 dl/g, about 0.5-0.9 dl/g, about 0.55-0.9 dl/g, or about 0.6-0.85 dl/g. In some embodiments, the crystalline polyester layer can include a polyester resin with a melting point of about 245-270° C., about 250-265° C., or about 255-260° C. In some embodiments, the crystalline polyester layer can include a polyester resin with a heat of fusion of about 20-60 J/g, about 25-55 J/g, or about 30-46 J/g. In some embodiments, the crystalline polyester layer can include a polyester resin with a density of about 1-2 g/cm$^3$, about 1.2-1.6 g/cm$^3$, about 1.3-1.5 g/cm$^3$, or about 1.4 g/cm$^3$.

Crystallinity can be defined as the weight fraction of material producing a crystal melting endotherm when measured using a differential scanning calorimeter. For a high crystalline polyester, an exothermic peak in the melt range of 220° C. to 290° C. can be observed. High crystallinity can therefore be defined as the ratio of the heat capacity of material melting in the range of 220° C. to 290° C. versus the total potential heat capacity for the entire material present if it were all to crystallize (e.g. 121 J/g). A crystallinity value of greater than about 35% weight fraction is considered high crystallinity.

The crystalline polyester layer can further include other additives such as antiblock and/or slip additives. The additives can typically be solid particles dispersed within the layer effectively to produce a low coefficient of friction on the exposed surface of the layer. This low coefficient of friction can help the film to move smoothly through the film formation, stretching, and/or wind-up operations. Without such antiblocking and/or slip additives, the outer surfaces can be more tacky and can likely cause the film being fabricated to stick to itself and to processing equipment causing excessive production waste and low productivity.

The antiblock and/or slip additives can be added to the base film, base layer of the base film, and/or skin layer of the base film in an amount of about 0.01-0.5 wt %, about 0.03-0.4 wt %, or about 0.1-0.4 wt % of the layer. Examples of antiblock and/or slip additives that may be used for polyester film applications can include amorphous silica particles with mean particle size diameters in the range of about 0.05-0.1 µm at concentrations of 0.1-0.4 wt % the film or layer; calcium carbonate particles with a medium particle size of 0.3-1.2 µm at concentrations of 0.03-0.2 wt % the film or layer; and precipitated alumina particles of sub-micron sizes with an average particle size of about 0.1 µm at concentrations of 0.1-0.4 wt % of the layer. Additional examples include inorganic particles, aluminum oxide, magnesium oxide, titanium oxide, such complex oxides as kaolin, talc, and montmorillonite, such carbonates as calcium carbonate and barium carbonate, such sulfates as calcium sulfate and barium sulfate, such titanates as barium titanate and potassium titanate, and such phosphates as tribasic calcium phosphate, dibasic calcium phosphate, and monobasic calcium phosphate, or combinations thereof. Two or more of these may be used together to achieve a specific objective. As examples of organic particles, vinyl materials such as polystyrene, crosslinked polystyrene, crosslinked styrene-acrylic polymers, crosslinked acrylic polymers, crosslinked styrene-methacrylic polymers, and crosslinked methacrylic polymers, as well as such other materials as benzoguanamine formaldehyde, silicone, and polytetrafluoroethylene may be used or contemplated in the base film or layers of the base film. One way to incorporate the aforementioned antiblock particles can be via masterbatch addition. In such an embodiment, a high crystalline polyester layer can be produced by extruding a pellet-to-pellet mix of unfilled polyester pellet and masterbatch polyester pellet (additive concentrate).

In some embodiments, the amorphous polyester skin layer can include about 70-100% of any of the following or combinations of the following: isophthalate modified copolyesters, sebacic acid modified copolyesters, diethyleneglycol modified copolyesters, triethyleneglycol modified copolyesters, and/or cyclohexanedimethanol modified copolyesters. In some embodiments, copolyesters in the amorphous polyester skin layer have a low melting or amorphous aromatic copolyester (such as one based on terephthalate/isophthalate copolymer with ethylene glycol or a copolyester made from a combination of terephthalic acid, ethylene glycol, and cyclohexyldimethanol). In some embodiments, the amorphous polyester skin layer can include a copolymer with about 15-20 wt % isophthalate and about 80-85 wt % terephthalate polyesters with ethylene glycol.

The base film can produced by melt extrusion (if monolayer) or co-extrusion (if comprised by two or more layers, e.g., base and skin layer as described above). In addition, the base film can be stretched in one or two orthogonal directions, i.e., for mono- or biaxial orientation. This orientation process can provide greater strength for the base film, and thus also for the overall film. The orientation also can permit the film to be produced to a thinner cross-section dimension.

A heat seal structure can be applied to one side of the base film. For example, heat seal structure 12 is applied to one side of base film 10 in FIG. 1. In some embodiments, the heat seal structure can be applied to one side of the skin layer of the base film that is opposite the base layer of the base film. In some embodiments, a primer layer can be applied to one side of the base film. In some embodiments, the primer layer can be added by a solution coating method, such as gravure roll coating. In some embodiments, the primer layer comprises polyethylenimine, ethylene acrylic acid copolymer, ethylene methyl acrylate, urethane, or combinations thereof. In some embodiments, the dry coat weight of the primer layer can be up to about 0.03 pounds per ream. In some embodiments, the dry coat weight of the primer layer can be about 0.005-0.02, about 0.0075-0.015, about 0.0075-0.0125, or about 0.01 pounds per ream. The primer layer can be between the base film and the (extrusion-coated) heat seal structure to help ensure strong adhesion of the heat seal structure to the base film. In some embodiments, the primer layer can be formed using MICA A-131-X. The heat seal structure can be applied to the side of the primer layer facing away from the base film. Such a configuration is shown in FIG. 1 with base film 10, primer layer 11, and heat seal structure 12. In some embodiments, the heat seal structure can be applied to one side of the base film, with or subsequent to, applying the primer layer. In some embodiments, the heat seal structure is extrusion-coated on to the base film. In some embodiments, the heat seal structure is extrusion-coated on the base film, with or subsequent to, applying the primer layer. The extrusion-coating can be applied under conditions that prevent excessive heating which could degrade the heat-seal polymers.

The heat seal structure can provide the film with the ability to be heat-sealed to itself or to other films, sheets, or trays made from crystallized polyethylene terephthalate (CPET), amorphous polyethylene terephthalate (APET), foil, PET-coated paperboard, PE-coated paperboard, PVC, glass, polypropylenes or polyethylenes, polylactic acid, polystyrenes (PS), or other polyolefins at temperatures ranging from 50 to 200° C. The heat seal structure can be formulated to provide either a destructive bond, or preferably a peelable bond to the other tray or container material. In some embodiments, the seal range for the heat seal structure (to itself or to other substrates) is between 300 gm/in to 3,000 gm/in (based on sealing at 275° F., 30 psia (jaw pressure), 0.5 seconds dwell). In some embodiments, the heat seal structure's thickness is between 25 and 95 μm or 47 to 77 μm.

The heat seal structure can include a thermally activatable adhesive composition, typically referred to as hot-melt adhesive resin. The heat seal structure can provide the film with the ability to be heat-sealed to itself, other films, sheets, trays, or other substrates. These substrates, films, sheets, or trays can be made from crystallized polyethylene terephthalate (CPET), amorphous polyethylene terephthalate (APET), foil, polyethylene terephthalate-coated (PET) paperboard, polyethylene (PE)-coated paperboard, PVC, glass, aliphatic olefin polymers such as polypropylene and polyethylene, and other polyolefins such as polystyrene (PS) and the like.

The hot-melt, thermally activated adhesive composition can include polymers selected from polyethylene homopolymers such as low density polyethylene (LDPE) and medium density polyethylene (MDPE); copolymers of ethylene and at least one ethylenically unsaturated comonomer selected from vinyl acetate, acrylic acid, $C_1$-$C_4$ alkyl ester of acrylic acid, $C_1$-$C_4$ alkyl ester of a $C_1$-$C_4$ alkylacrylic acid, and cyclic olefin copolymers and blends thereof. Representative examples of copolymer of ethylene and ethylenically unsaturated comonomer include ethylene/vinylacetate copolymer (EVA), ethylene/acrylic acid copolymer (EAA) ethylene/methyl acrylate copolymer (EMA), ethylene/methylmethacrylate copolymer (EMMA), ethylene/methyl acrylate/acrylic acid copolymer (EMAAA), ethylene/methyl acrylate/methacrylic acid copolymer (EMAMAA), and ethylene/butyl acrylate/acrylic acid copolymer (EBAAA).

The heat seal structure can be a monolayer or can be multilayered. The heat seal structure can be deposited by extrusion-coating on the primer layer or on the base film. In some embodiments, the heat seal structure can include two or three sublayers. Each of these sublayers can also be extrusion-coated either individually or together on the primer layer or on the base film. For example, FIG. 1 illustrates sublayer 12a, sublayer 12b, and sublayer 12c of heat seal structure 12.

The first sealant sublayer (i.e., the sublayer closest to the base film) can act as a tie layer to the base film (with or without primer layer in between). The first sealant sublayer can include low density polyethylene (LDPE). In some embodiments, the first sealant layer can be a conventional high-pressure autoclave-polymerized LDPE resin such as, but not limited to, Marflex® 1017 and Marflex® 1019 (Chevron Philips) and Dow LDPE 722 (Dow Chemical Co.). These materials can be characterized by high melt strength and are known for excellent extrusion-coating performance, stability and high melt strength, and low degree of "necking". Another advantage of these LDPE materials can be the high bonding strength to the amorphous or low crystallinity layer of the base film. This advantage can be achieved by the surface oxidation of the extrusion-coated layer melt curtain emerging from the die. Surface oxidation of the extrusion-coating can be controlled by melt temperature and the amount of time within the air gap as determined by the line speed and the distance between the die exit and the contact with the base film. Additionally, an optional ozone-generating unit can supply ozone gas within this gap to aid in oxidation of the polymer surfaces of the heat seal structure and increase processing window (such as lower extrusion temperatures and/or smaller amount of residence time within the air gap). Using these LDPE materials in the first sealant sublayer can provide a good extrusion-coating base upon which the second and/or third sealant sublayers are coextruded with the first sealant sublayer. In some embodiments, the thickness of the first sealant layer can be about 2.5-7.5 microns or 5-6.25 microns.

The second sealant sublayer (i.e., the sublayer on a side of the first sealant sublayer opposite the base film) can act as a core layer of the heat seal structure. The second sealant sublayer can include EVA. EVA is a copolymer of ethylene and vinyl acetate (the vinyl acetate percentage ranging between 12-28 mole %, preferably 19 mole % of the polymer) that can provide a suitable heat sealable material due to its low melting temperature. In some embodiments, the thickness of the second sealant layer can be about 2.5-12.5 microns or 5-10 microns.

The third sealant sublayer (i.e., the sublayer on a side of the second sealant sublayer opposite the first sealant sublayer) can act as a skin layer of the heat seal structure. In some embodiments, the thickness of the third sealant layer can be about 1.25-3.75 microns or 1.75-3 microns. The third sealant layer can include an antifog additive. In some embodiments, the antifog additive can be in the form of a masterbatch in a polyethylene carrier resin.

Typically, an antifog additive's active ingredients can be amphiphilic molecules with polar and non-polar segments. The non-polar segment has an affinity for the polymer matrix, while the polar segment does not. This partial incompatibility can drive migration of the antifog additive to the surface of the heat seal structure (more precisely, in the case of lidding film, the inner surface of the heat seal structure, i.e. the side facing the product, upon which the water droplets are being formed from moisture condensation). The antifog additive can act as a surface-active agent, resulting in the heat seal structure's outer surface becoming more polar (polymer surface energy increases); the antifog can partially dissolve in the water droplets (decreases surface tension of water) and thus, can allow the water droplets to spread out as a thin film instead of discrete droplets, helping to ensure transparency and a clearer view of the package contents by the consumer.

One problem with conventional antifog additive's active ingredients is the continued migration to both the exposed film surface facing the product and to the opposite direction towards the underlying layers and base film. Migration towards the exposed surface can result in the antifog additive's active ingredients being slowly depleted and also to affecting seal strength by weakening the seal strength. Migration towards the opposite direction can result in the antifog additive's active ingredients eventually reaching the extrusion-coating interface with the base film (or primer layer) and potentially causing delamination from the base film. For the most effective performance, the additive's active ingredients can be one that undergoes little or no migration. The antifog additive's active ingredients that find themselves exposed to the surface after extrusion-coating and film-making (and also a small amount that is allowed to migrate immediately after the film is made) can be permanently anchored to the exposed surface and provide the necessary surface activation but may not leach out. Also they may not migrate to the opposite direction causing potential delamination issues with the base film. Such additive's active ingredients in that category can be esters of aliphatic alcohols, polyethers, polyhydric alcohols, esters of polyhydric aliphatic alcohols, polyethoxylated aromatic alcohols, nonionic ethoxylates, and hydrophilic fatty acid esters. Specific antifog additive's active ingredients that may be used include polyoxyethylene, sorbitan monostearate, polyoxyethylene sorbitan monolaurate, polyoxyethylene monopalmitate, polyoxyethylene sorbitan tristearate, polyoxyethylene sorbitan trioleate, poly(oxypropylene), polyethoxylated fatty alcohols, polyoxyethylated 4-nonylphenol, polyhydric alcohol, propylene diol, propylene triol, and ethylene diol, monoglyceride esters of vegetable oil or animal fat, mono- and/or diglycerides such as glycerol mono-stearate.

Accordingly, the active ingredient of the antifog additive in the lidding films disclosed herein can be non-migratory. The non-migratory antifog active ingredient can eliminate or decrease the impact on seal strength or seal characteristics when compared to other antifog active ingredients. The non-migratory antifog active ingredient can include a combination of: (A) a non-ionic surfactant; and (B) a salt of organic sulfonic acid. Without being bound by any theory, it is believed that the combination of a non-ionic surfactant with a salt of organic sulfonic acid can provide the non-migratory properties. Examples of non-ionic surfactants and salt of organic sulfonic acid can be found in U.S. Pat. No. 6,958,193 and US Publication No. 2005/0136275 which are herein incorporated by reference in their entirety. The weight ratio of the non-ionic surfactant to the salt of organic sulfonic acid can be about 10/100-100/100, about 20/80-99/1, about 50/50-90/10, or about 60/40-80/20. The non-migratory active ingredient in the antifog additive masterbatch can be less than or equal to about 20 wt % the masterbatch (remainder polyethylene carrier resin). In some embodiments, the non-migratory active ingredient in the antifog additive masterbatch is about 5-30 wt %, about 10-25 wt %, about 15-20 wt %, about 17-19 wt %, or about 18 wt % the masterbatch. In some embodiments, the third sealant layer can include about 0.05-6 wt %, about 0.2-5.5 wt %, about 1-4.5 wt %, about 1.5-5 wt %, about 1.5-4.5 wt %, about 1.8-3.5, or about 1.8-2.7 wt % the non-migratory active ingredient in the antifog additive. In some embodiments, the third sealant layer can include EVA. In some embodiments, the third sealant layer can include about 1-30 wt %, about 5-25 wt %, about 10-20 wt %, or about 10-15 wt % the antifog additive masterbatch. In some embodiments, the third sealant layer can include about 70-99 wt %, about 75-95 wt %, about 80-90 wt %, or about 85-90 EVA.

Specific examples of a non-ionic surfactant include, but are not limited, diglycerol monostearate; triglycerol monolaurate; sorbitan monostearate; myristyl diethanol amide; glycerol monostearate; mixture of glycerol monostearate and sorbitan monostearate at weight ratio of 50/50; lauryl diethanol amine; mixture of glycerol monostearate and myristyl diethanol amide at weight ratio of 50/50; mixture of glycerol monostearate and lauryl diethanol amine at weight ratio of 50/50; diglycerol monolaurate (melting point=20° C.); mixture of diglycerol monostearate (melting point=55° C.) and diglycerol monooleate (melting point=2° C.) at weight ratio of 65/35; mixture of diglycerol monostearate (melting point=55° C.) and glycerol monooleate (melting point=12° C.) at weight ratio of 50/50; mixture of diglycerol monolaurate (melting point=20° C.) and glycerol monooleate (melting point=12° C.) at weight ratio of 70/30; mixture of sorbitan monooleate (melting point=8° C.) and glycerol monooleate (melting point=12° C.) at weight ratio of 70/30; mixture of glycerol monooctanate (melting point=35° C.) and diglycerol monolaurate (melting point=20° C.) at weight ratio of 15/85; mixture of glycerol monoerucate (melting point=50° C.) and diglycerol monolaurate (melting point=20° C.) at weight ratio of 10/90; mixture of tetraglycerol monooctanate (melting point=25° C.) and diglycerol monolaurate (melting point=20° C.) at weight ratio of 15/85; mixture of tetraglycerol monoerucate (melting point=50° C.) and diglycerol monolaurate (melting point=20° C.) at weight ratio of 10/90; mixture of glycerol monolaurate (melting point=55° C.) and diglycerol monolaurate (melting point=20° C.) at weight ratio of 10/90; mixture of tetraglycerol monooleate (melting point=25° C.) and diglycerol monolaurate (melting point=20° C.) at weight ratio of 10/90; ethylene oxide adduct of octyl alcohol (average molecular weight=450, melting point=5° C.); ethylene oxide adduct of docosenyl alcohol (average molecular weight=1200, melting point=50° C.); diglycerol monostearate (melting point=55° C.); sorbitan monostearate (melting point=60° C.); mixture of diglycerol monostearate (melting point=55° C.) and glycerol monostearate (melting point=70° C.) at weight ratio of 50/50; mixture of sorbitan monostearate (melting point=60° C.) and glycerol monostearate (melting point=70° C.) at weight ratio of 50/50; ethylene oxide adduct of octanic acid (average molecular weight=450, melting point=5° C.); ethylene oxide adduct of docosenic acid (average molecular weight=1200, melting point=50° C.); ethylene oxide adduct of glycerol monooctanate (average molecular weight=900, melting point=30° C.); diglycerol monooctanate (melting point=−8° C.); ethylene oxide adduct of octadecenyl alcohol (average molecular weight=900, melting point=2° C.); ethylene oxide adduct of dodecanoic acid (average molecular weight=350, melting point=7 C.); ethylene oxide adduct of sorbitan monooleate (average molecular weight=950, melting point=−10° C.);

ethylene oxide adduct of glycerol monoerucate (average molecular weight=1000, melting point=30° C.); ethylene oxide adduct of tetraglycerol monooctanate (average molecular weight=1200, melting point=25° C.); or ethylene oxide adduct of tetraglycerol monoerucate (average molecular weight=1400, melting point=25° C.).

Specific examples of a salt of organic sulfonic acid include, but are not limited, sodium myristyl sulfonate; sodium dioctyl sulfo succinate; sodium dodecyl benzene sulfonate; mixture of sodium dioctyl sulfo succinate and sodium dodecyl benzene sulfonate at weight ratio of 50/50; lithium dibutyl naphthalene sulfonate; potassium .alpha.-(p-nonylphenyl)-.omega.-hydroxypoly(oxyethylene) sulfoacetate (oxyethylene repetition number=3); sodium dodecylsulfonate; sodium tetradecylsulfonate; sodium pentadecylsulfonate; sodium Hexadecylsulfonate; mixture of sodium tetradecylsulfonate and sodium pentadecylsulfonate at weight ratio of 50/50; lithium dodecylsulfonate; lithium octadecylsulfonate; potassium dodecylsulfonate; potassium octadecylsulfonate; sodium hexylsulfonate; sodium docosylsulfonate; sodium docosylbenzene sulfonate; mixture of potassium diethylnaphthalene sulfonate and potassium docosylbenzene sulfonate at weight ratio of 50/50; potassium tetradecylsulfonate; lithium dodecylbenzene sulfonate; potassium 1,2-bis(octyloxycarbonyl)-1-ethane sulfonate; mixture of sodium dodecylbenzene sulfonate and sodium 1,2-bis(octyloxycarbonyl)-1-ethane sulfonate at weight ratio of 50/50; potassium 1,2-bis(ethyloxycarbonyl)-1-ethane sulfonate; sodium 1,2-bis(dodecyloxycarbonyl)-1-ethane sulfonate; mixture of lithium 1,2-bis(ethyloxycarbonyl)-1-e-thane sulfonate and lithium 1,2-bis(dodecyloxycarbonyl)-1-ethane sulfonate at weight ratio of 50/50; lithium octylsulfonate; potassium hexylbenzen sulfonate; lithium dibutylnaphthalene sulfonate; mixture of lithium octylsulfonate and lithium dibutylnaphthalene sulfonate at weight ratio of 50/50; sodium octylsulfonate; potassium 1,2-bis(docosyloxycarbonyl)-1-ethane sulfonate; or mixture of lithium octylsulfonate and lithium 1,2-bis(docosyloxycarbonyl)-1-ethane sulfonate.

The heat seal structure can be modified by addition of organic or inorganic particulates for various purposes. Representative examples of such additives include amorphous silica, calcium carbonate, clay, talc, diatomaceous earth, cross-linked spherical polydimethylsiloxane, cross-linked spherical organic polymers, or glass beads, or mixtures of two or more of these ingredients for antiblocking purposes; slip agents such as, but not limited to, a fatty amide: erucamide, stearamide, behenamide, or bisamides (e.g. stearyl-erucamide), silicone oil, and/or mixtures of same; antifog agents such as, but not limited to, glycerol monostearate; and antistatic agents such as, but not limited to, glycerol monostearate. These additives can be added to the heat seal structure or any sublayer of the heat seal structure in an amount of about 0.01-0.5 wt %, about 0.03-0.4 wt %, or about 0.1-0.4 wt % of the layer. In some embodiments, the additives can be only in the outermost sublayer of the heat seal structure, i.e., the layer that is furthest from the base film. A multilayer heat seal structure can be free of certain additives in sub-layers, i.e., those sublayers closer in proximity to the adhesive primer layer or base film; and additives in the outermost sublayer of the heat seal structure (i.e. the side of the heat seal structure facing the product or product container). For example, slip agent particulates can be incorporated into the outermost sublayer of the heat seal structure to reduce blocking of the film and promote ease of film handling.

The side of the heat seal structure opposite the base film (i.e., the outermost side of the heat seal structure) can also be treated. In some embodiments, the side of the heat seal structure opposite the base film can be modified by an electrical-discharge treatment (such as plasma or corona) to provide specific seal properties to specific substrates. In some embodiments, the applied watt density to the side of the heat seal structure opposite the base film can be in the range of 0.5-5 watts/square feet/min. In some embodiments, the third sealant sublayer is the sublayer of the heat seal structure that is treated (e.g., corona treated or plasma treated).

The heat seal structure can have a thickness that ranges from about 6-24 microns or about 12-20 microns. In addition, the normal heat seal parameters for the lidding films disclosed herein can be about 200-400° F., about 275-400° F., or about 300-375° F.

EXAMPLES

Raw Materials for Examples
  Base Film:
    Commercial PET polyester film Lumirror® 48G PA10, available from Toray Plastics (America), Inc., having a thickness of 48 gauge (12 μm) and an asymmetrical two-layer structure comprising a main layer comprising crystallized PET; and a coextruded skin layer, suitable for adhesion or printing, comprising an amorphous copolyester. In the examples and comparative examples where this film was employed as the base film, extrusion-coating of the sealant layer was conducted on the surface corresponding to the amorphous polyester skin layer.
  Seal Layer(s):
    Marflex® 1017: Low-density (LDPE) resin produced by Chevron Philips (density 0.917 g/cc, melt index 7 g/10 min, melting point 106° C.).
    Mica A-131-X: Polyethyleneimine water-based extrusion primer from Mica™ Corporation containing 5% solids with a pH of 10.7.
    Ateva® 1943: Ethylene vinyl acetate ("EVA") resin (18 mole % vinyl acetate; density 0.937 g/cc, melt index 30 g/10 min, melting point 85° C.) from Celanese.
    Ateva® 2821A: Ethylene vinyl acetate ("EVA") resin (28 mole % vinyl acetate; density 0.948 g/cc, melt index 25 g/10 min, melting point 70° C.) from Celanese.
    Takemoto Oil & Fat Co. TRB-002: Antifog masterbatch from Takemoto at an active ingredient (comprising a nonionic surfactant and a salt of organic sulfonic acid) level of less than or equal to 20 wt % in a polyethylene carrier resin.
    Mitsui AF 22PE-2700: Antifog formulation in the form of concentrate in polyethylene resin.
    Elecutmaster AB-8200: Antiblock masterbatch from Takemoto Oil & Fat Co., Ltd., comprising 30 wt % of an antiblock and slip agent with average particle size 3-4 μm in polyethylene carrier resin.
    Polybatch F20: Antiblock additive masterbatch (active ingredient natural silica with an average size of 9 μm, present at 20 wt %) in polyethylene carrier (melting point 122.5° C.) produced by A. Schulman.
Film Conversion Process for Examples
    Extrusion-coating was conducted on an extrusion-coating line with in-line corona treatment, gravure roll priming coating station, and ozonation as noted in the examples below. The extrusion-coated seal layer was applied as a molten resin curtain onto the base polymeric film (Lumirror™ PA10). The temperature range of this molten resin curtain depends on the type of resin used but generally was between 175° C. and 350° C. This molten curtain was cooled as soon as it contacts the polymeric film since a chill roll supports the base film. The chill roll is usually kept at temperatures between 50° C. and 20° C.

Example 1

A 48G polyester film was extrusion-coated with 73G of a heat seal structure, comprising a tie layer, a core layer, and a skin layer as shown in Table 1. The 9G skin sublayer contains 10 wt % of TRB-002.

Example 2

A 48G polyester film was extrusion-coated with 73G of a heat seal structure, comprising a tie layer, a core layer, and a skin layer as shown in Table 1, the 9G skin sublayer contains 15 wt % of TRB-002.

Comparative Example 1

A 48G polyester film was extrusion-coated with 73G of a heat seal structure, comprising a tie layer, a core layer, and a skin layer as shown in Table 1.

Comparative Example 2

A 48G polyester film was extrusion-coated with 7G of a heat seal structure, comprising a tie layer, a core layer, and a skin layer as shown in Table 1.

Comparative Example 3

DuPont's Mylar® OLAF antifog lidding film.

Comparative Example 4

DuPont's Mylar® RL42AFT antifog lidding film.

Comparative Example 5

A 48G polyester film was extrusion-coated with 72G of a heat seal structure, comprising a tie layer, a core layer, and a skin layer as shown in Table 1, the 9G skin sublayer contains 10 wt % AF 22PE produced by Mitsui Plastics.

TABLE 1

Film Layer Structures with Compositions of the Examples

| | Example 1 | | Example 2 | |
|---|---|---|---|---|
| | Composition (wt % as applicable) | Thickness | Composition (wt % as applicable) | Thickness |
| Overall Structure | | 121.5 G (30.9 μm) | | 121.5 G (30.9 μm) |
| Base Film | Lumirror ® PA10 | 48 G (12.2 μm) | Lumirror ® PA10 | 48 G (12.2 μm) |
| Treatment | Corona | 0.2 W/m² | Corona | 0.2 W/m² |
| Primer | Mica A-131-X | 0.01 #/rm | Mica A-131-X | 0.01 #/rm |
| Tie Sealant Layer of Heat-Sealant Structure | Marflex ® 1017 LDPE 100% | 24.46 G (6.2 μm) | Marflex ® 1017 LDPE 100% | 24.46 G (6.2 μm) |
| Core Sealant Layer of Heat-Sealant Structure | Ateva ® 1943 100% | 39.22 G (10.0 μm) | Ateva ® 1943 100% | 39.22 G (10.0 μm) |
| Skin Sealant Layer of Heat-Sealant Structure | Ateva ® 1943 87% Takemoto TRB-002 10% Takemoto AB-8200 3% | 9.81 G (2.5 μm) | Ateva ® 1943 72% Takemoto TRB-002 15% Ateva ® 2821A 10% Takemoto AB-8200 2% | 9.81 G (2.5 μm) |
| Total Heat-Sealant Structure Thickness | | 73.46 G (18.6 μm) | | 73.46 G (18.6 μm) |

| | Comparative Example 1 | | Comparative Example 2 | |
|---|---|---|---|---|
| | Composition (wt % as applicable) | Thickness | Composition (wt % as applicable) | Thickness |
| Overall Structure | | 121.5 G (30.9 μm) | | 120 G (30.5 μm) |
| Base Film | Lumirror ® PA10 | 48 G (12.2 μm) | Lumirror ® PA10 | 48 G (12.2 μm) |
| Treatment | Corona | 0.2 W/m² | Corona | 0.2 W/m² |
| Primer | Mica A-131-X | 0.01 #/rm | Mica A-131-X | 0.01 #/rm |
| Tie Sealant Layer of Heat-Sealant Structure | Marflex ® 1017 LDPE 100% | 24.46 G (6.2 μm) | Marflex ® 1017 LDPE 100% | 24 G (6.1 μm) |
| Core Sealant Layer of Heat-Sealant Structure | Ateva ® 1943 100% | 39.22 G (10.0 μm) | Ateva ® 1943 100% | 39 G (9.9 μm) |
| Skin Sealant Layer of Heat-Sealant Structure | Ateva ® 1943 97% Takemoto AB-8200 3% | 9.81 G (2.5 μm) | Ateva ® 1943 87% Ateva ® 2821A 10% Takemoto AB-8200 3% | 9 G (2.3 μm) |
| Total Heat-Sealant Structure Thickness | | 73.46 G (18.6 μm) | | 72 G (18.3 μm) |

TABLE 1-continued

Film Layer Structures with Compositions of the Examples

| | Example Comparative Example 5 | |
|---|---|---|
| | Composition (wt % as applicable) | Thickness |
| Overall Structure | | 120 G (30.5 μm) |
| Base Film | Lumirror ® PA10 | 48 G (12.2 μm) |
| Treatment | Corona | 0.2 W/m² |
| Primer | Mica A-131-X | 0.01 #/rm |
| Tie Sealant Layer of Heat-Sealant Structure | Marflex ® 1017 LDPE 100% | 24 G (6.1 μm) |
| Core Sealant Layer of Heat-Sealant Structure | Ateva ® 1943 100% | 39 G (9.9 μm) |
| Skin Sealant Layer of Heat-Sealant Structure | Ateva ® 1943 89% Mitsui AF 22PE 10% A. Schulman Polybatch F20 1% | 9 G (2.3 μm) |
| Total Heat-Sealant Structure Thickness | | 72 G (18.3 μm) |

Thickness of extruded films, coextruded film layers, and extrusion coated film layers can be expressed in G (film gauge) units. 1 G equals 0.01 mil (1 mil=1/1000 in). The film gauge unit can also be converted to μm (micrometer or "micron" unit) by multiplying times 0.254 (i.e. 1G=0.254 μm).

Thickness (more precisely weight per unit area) of coated primer can expressed in units of #/rm (pounds per ream). Ream is a unit of surface area equal to 3000 ft² (=432,000 in²).

Testing

Antifogging Test:

Each example's antifog performance was judged using Toray Plastics (America), Inc.'s antifogging test. Materials needed for the antifogging test include glass Ball® canning jars with metal twist-on rims for every sample and a control, the films to be tested, and a camera to document the antifog performance results. Each of the films to be tested were cut into 4" by 4" squares and the jars were filled with 300 mL of water. The antifog-containing side of the film was placed over the jar's mouth, facing downward towards the water, taking care not to splash any water onto the film. A flat, tight seal of the film to the jar was secured using the metal screw-on rims. The jars were left at room temperature for an hour, then photographed for the initial time point signifying start of the test; and placed in a refrigerator kept at 35 to 45° F. The jars were checked at 15, 30, 60, 120, and 1440 minutes, photographed and judged on their antifog performance. Antifogging performance is based on a numerical ranking corresponding to description of fogging appearance and the scale is shown in Table 2.

TABLE 2

| Antifog Performance Ranking | |
|---|---|
| Antifog Ranking | Description |
| 1 | Foggy fine drops |
| 2 | Very hazy small drops |
| 3 | Hazy medium drops |
| 4 | Translucent large drops |
| 5 | Particularly clear small drops |

TABLE 2-continued

| Antifog Performance Ranking | |
|---|---|
| Antifog Ranking | Description |
| 6 | Mostly clear medium drops |
| 7 | Clear large drops |
| 8 | Clear |

FIGS. 2A-G contain the pictures of the Examples and the Comparative Examples' antifogging performance at 120 minutes.

The lidding films disclosed herein have an antifog ranking of at least 5, at least 6, or at least 7. In some embodiments, the lidding films disclosed herein have an antifog ranking of 5-8, 6-8, 7-8, or 8.

Seal Strength Testing:

As described above, another important attribute of the lidding films disclosed herein are that they have strong seals to crystalline polyester trays. The examples were sealed using a tabletop Sentinel™ sealer (model 12ASL) at 30 psia and 0.5 second dwell, with one sealer jaw (upper) heated and the other sealer jaw (lower) unheated. A range of temperatures were tested ranging from 225° F. to 375° F. A CPET tray (obtainable from a CPET tray manufacturer or from retail store shelves and cleaned of product) was used to seal with the antifog film. The bottom of the CPET tray is used for flatness and thickness uniformity. A piece of CPET tray about 3"×2" is cut out and aligned with a similarly sized piece of test film, with the heat seal structure side of the test film against the CPET. This construct was then placed in the Sentinel™ sealer jaws and heat-sealed together. The sealed construct was then cut into 1" wide sample strips. The samples were then peeled on an Instron® tensile tester machine with the seal strength and peel characteristics noted.

The lidding films disclosed herein have a seal strength to itself or other substrates such as crystalline polyester trays in the range of about 500-2,500 gf/in, about 500-2,000 gf/in, about 1,000-2,000 gf/in, about 1,000-1,500 gf/in, about 1,300-2,500 gf/in, about 1,300-2,000 gf/in, or about 1,300-1,500 gf/in, measured at 350° F., 30 psia jaw pressure, 0.5 seconds dwell.

Table 3 below provides the heat seal strength results of the Examples and Comparative Examples at 350° F.

TABLE 3

Testing Results of the Films in the Examples

|  | Seal Strength at 350 F. (gf/in) | Peel Characteristics | Antifog Ranking at 120 Minutes |
|---|---|---|---|
| Example 1 | 1358 | Clean Peel | 6 |
| Example 2 | 1393 | Clean Peel | 7 |
| Comparative Example 1 | 992 | Clean Peel | 1 |
| Comparative Example 2 | 1200 | Clean Peel | 1 |
| Comparative Example 3 | 1296 | Clean Peel | 4 |
| Comparative Example 4 | 945 | Clean Peel | 5 |
| Comparative Example 5 | 634 | Clean Peel | 5 |

As shown in the above Table, the films of Examples 1 and 2 (containing 10 and 15 wt %, respectively of Takemoto TRB-002 antifog masterbatch formulation, i.e. 1.8 and 2.7 wt. % respectively of the active ingredient in the layer with heat seal skin layer) have acceptable antifog rankings vs. either a blank control film (i.e. no antifog present; Comp. Ex. 2) or vs. films containing earlier generations of standard antifog formulations. In addition to the good antifog ratings, excellent seal strengths and peel characteristics to CPET tray material are maintained in Examples 1 and 2.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A lidding film comprising:
a biaxially oriented polyester-based base film comprising a crystalline polyester base layer and an amorphous polyester skin layer;
a polyethylenimine primer layer directly on a side of the amorphous polyester skin layer opposite the crystalline polyester base layer; and
an extrusion-coated heat seal structure on a side of the primer layer opposite the base film, wherein the heat seal structure comprises a skin layer comprising 0.2-5.5 wt % non-migratory antifog active ingredient and 70-99 wt % ethylene vinyl acetate (EVA).

2. The lidding film of claim 1, wherein the non-migratory antifog active ingredient comprises a non-ionic surfactant and a salt of organic sulfonic acid.

3. The lidding film of claim of claim 2, wherein the weight ratio of the non-ionic surfactant to the salt of organic sulfonic acid is 20/80-99/1.

4. The lidding film of claim 1, wherein the skin layer of the heat seal structure comprises a polyethylene carrier resin for the non-migratory antifog active ingredient.

5. The lidding film of claim 4, wherein in the skin layer of the heat seal structure, the non-migratory antifog active ingredient comprises 10-25 wt % of the combination of non-migratory antifog active ingredient and polyethylene carrier resin.

6. The lidding film of claim 1, wherein the crystalline polyester base layer comprises a polyester resin with an intrinsic viscosity of 0.5-0.9 dl/g.

7. The lidding film of claim 1, wherein the crystalline polyester base layer comprises polyethylene terephthalate.

8. The lidding film of claim 1, wherein the amorphous polyester skin layer comprises at least one of isophthalate modified copolyesters, sebacic acid modified copolyesters, diethyleneglycol modified copolyesters, triethyleneglycol modified copolyesters, or cyclohexanedimethanol modified copolyesters.

9. The lidding film of claim 1, wherein the polyester-based base film comprises 0.1-0.4 wt % antiblock or slip additives.

10. The lidding film of claim 1, wherein the heat seal structure comprises a core layer comprising EVA on a side of the skin layer of the heat seal structure.

11. The lidding film of claim 10, wherein the heat seal structure comprises a tie layer comprising low density polyethylene (LDPE) on a side of the core layer opposite the skin layer of the heat seal structure.

12. The lidding film of claim 11, wherein the primer layer is between the tie layer and the base film.

13. The lidding film of claim 1, wherein the lidding film has an antifog ranking of at least 6.

14. The lidding film of claim 1, wherein the lidding film has a seal strength to crystalline polyester trays of 500-2500 gf/in.

15. A lidding film comprising:
a biaxially oriented polyester-based base film comprising a crystalline polyester base layer and an amorphous polyester skin layer;
a polyethylenimine primer layer directly on a side of the amorphous polyester skin layer opposite the crystalline polyester base layer; and
an extrusion-coated heat seal structure on a side of the primer layer opposite the base film, wherein the heat seal structure comprises:
a tie layer comprising low density polyethylene (LDPE) on a side of the amorphous polyester skin layer opposite the crystalline polyester base layer;
a core layer comprising EVA on a side of the tie layer opposite the amorphous polyester skin layer; and
a skin layer comprising 0.2-5.5 wt % non-migratory antifog active ingredient and 70-99 wt % ethylene vinyl acetate (EVA) on a side of the core layer opposite the tie layer.

* * * * *